United States Patent
Wang

(10) Patent No.: US 7,962,263 B2
(45) Date of Patent: Jun. 14, 2011

(54) ADAPTIVE NONLINEAR STEERING CONTROL SYSTEM AND METHOD FOR WORK VEHICLES

(75) Inventor: Guoping Wang, Naperville, IL (US)

(73) Assignee: CNH America LLC, New Holland, PA (US)

( * ) Notice: Subject to any disclaimer, the term of this patent is extended or adjusted under 35 U.S.C. 154(b) by 688 days.

(21) Appl. No.: 12/080,489

(22) Filed: Apr. 3, 2008

(65) Prior Publication Data

US 2009/0254254 A1    Oct. 8, 2009

(51) Int. Cl.
*G06F 17/00* (2006.01)
*B62D 5/04* (2006.01)

(52) U.S. Cl. ............ 701/42; 701/43; 180/446; 180/443; 318/432; 318/459

(58) Field of Classification Search .................. 701/41, 701/42, 43; 180/446, 443, 423; 318/432, 318/433, 459
See application file for complete search history.

(56) References Cited

U.S. PATENT DOCUMENTS

| | | | |
|---|---|---|---|
| 5,201,818 A * | 4/1993 | Nishimoto | 180/446 |
| 5,253,725 A | 10/1993 | Nishimoto | 180/79.1 |
| 5,469,357 A | 11/1995 | Nishimoto | 364/424.05 |
| 5,631,833 A * | 5/1997 | Wada et al. | 701/42 |
| 5,788,010 A * | 8/1998 | Mukai et al. | 180/446 |
| 5,984,042 A * | 11/1999 | Nishimoto et al. | 180/446 |
| 6,373,217 B1 * | 4/2002 | Kawada et al. | 318/564 |
| 6,442,463 B1 | 8/2002 | Qiu et al. | 701/44 |
| 6,450,287 B1 * | 9/2002 | Kurishige et al. | 180/446 |
| 6,691,818 B2 * | 2/2004 | Endo et al. | 180/446 |
| 6,854,559 B2 * | 2/2005 | Kurishige et al. | 180/446 |
| 7,177,745 B2 * | 2/2007 | Tsuchiya | 701/41 |
| 2004/0186644 A1 | 9/2004 | McClure et al. | 701/50 |
| 2005/0060074 A1 | 3/2005 | Sakai | 701/410 |
| 2005/0288834 A1 * | 12/2005 | Heiniger et al. | 701/23 |

* cited by examiner

*Primary Examiner* — Ronnie Mancho
(74) *Attorney, Agent, or Firm* — Patrick M. Sheldrake; Michael G. Harms

(57) ABSTRACT

A steering control system and method for automated steering of work vehicles that adapts to nonlinearities and uncertainties of steering mechanisms including a tolerance control law, a dynamic control law, and a saturation control law selected and executed in real time based on the magnitude of steering angle error, steering mode command, and manual override signal in real time. The dynamic control law includes a dynamic compensator having a double compensation zero, an integral, and a compensation gain, and further includes a deadband compensator and a control signal limiter.

16 Claims, 9 Drawing Sheets

ADAPTIVE NONLINEAR STEERING CONTROL SYSTEM AND METHOD FOR WORK VEHICLES

TECHNICAL FIELD

The present invention relates generally to adaptive, nonlinear steering control during automated vehicle guidance operation of work vehicles. In particular, the invention relates to a nonlinear steering control system and method having control laws that adapt in real time to include compensation for nonlinearities and uncertainties associated with a steering mechanism.

BACKGROUND ART

Global positioning system (GPS) based automated guidance systems for maneuvering work vehicles traveling along prescribed paths have found applications in precision farming operations to enhance productivity and reduce farming input cost. A GPS based work vehicle guidance system with a real-time kinematics (RTK) base station has achieved position measurement accuracy of one inch in terms of the position of GPS antenna mounted on the roof of the vehicle cab. A GPS based work vehicle guidance system with differential error correction signal from commercial satellites has achieved position measurement accuracy of four inches in terms of the position of GPS antenna mounted on the roof of the vehicle cab. The measured vehicle position is used by a GPS guidance algorithm to calculate a vehicle deviation from a prescribed path. The calculated deviation is further used by the GPS guidance algorithm to calculate a desired steering action, i.e., a steering command in terms of steering angle or steering rate, to correct the deviation and direct the vehicle to the prescribed path. During an automated vehicle guidance operation, the steering command is calculated periodically at the same update rate as that of GPS signal, generating a time sequence of steering commands in real time. Thereafter, a steering control system executes the steering commands, by actuation of the vehicle steering mechanism to the desired steering action in order for the vehicle to track the prescribed path.

A vision based automated guidance system uses visual images in a forward-looking view field to identify vehicle deviation from a desired path that is usually marked by row crops. The identified deviation is then used by a vision guidance algorithm to calculate a steering command, i.e., a desired steering action, to correct the deviation and direct the vehicle to the desired path. During an automated vehicle guidance operation, the steering command is calculated periodically at the same update rate as that of image processing, generating a time sequence of steering commands in real time. Thereafter, a steering control system executes the steering commands, by actuation of the vehicle steering mechanism to the desired steering action in order for the vehicle to track the prescribed path.

Known steering control techniques use conventional PID control which is a combination of proportional, integral and derivative control. The term PID is widely used because there are commercially available modules that allow for the user to set the values of each of the three control types. The PID control law is able satisfactorily to meet the specifications for a large portion of control problems, and the user simply has to determine the best values of the three control types. However, because PID control is based on linear system theory, it may not satisfactorily handle the full operating range of systems with severe nonlinearity and uncertainty. As a steering mechanism for a work vehicle presents severe nonlinearity problems and uncertainty problems, a conventional PID steering controller can not deliver robust performance.

Uncertainties in the deadband and the gain value of the steering mechanism may result from variations during the manufacturing process, variations in hydraulic pump supply pressure, variations of the ground resistance, and the like. As a result, a conventional PID steering control system requires field calibrations of control parameters, such as varying deadband values and gain values so that the control system performs well with particular components of the steering mechanism and condition of a field. This calibration is typically required upon replacement of components of the steering mechanism, and re-calibration may periodically be required to compensate for changes in the steering mechanism due to wear and the like. This calibration requirement is time consuming and usually frustrating for a non-technically oriented operator. Because PID steering control determines steering performance during normal steering operation, a robust controller with good performance is desirable.

Conventional PID steering controllers are designed to achieve zero error and continue to make steering corrections back and forth in opposite directions around zero error even when the steering error is very small. For example, due to nonlinearities in an electro-hydraulic steering mechanism, such as the deadband nonlinearity of a steering valve, these steering corrections result in persistent directional switching of the steering valve and considerable back and forth movement of a steering valve spool even for very small steering corrections. This zero-error control effort can also result in persistent steering cylinder rod push-pull vibrations around its regular course of movement. This means that a conventional PID steering controller results in unnecessary accelerated wear of the steering valve and steering cylinders.

In conventional PID steering control systems, dynamic performance degrades due to saturation nonlinearities of a steering mechanism when a steering error is large. The resulting response is typically slow with large over shoot and under shoot as well as long settling time. Improved responsiveness in the presence of large steering errors is desirable.

Therefore what is sought is a control system and method that overcomes one or more of the problems or shortcomings set forth above.

SUMMARY OF THE INVENTION

What is disclosed is a control system and method that overcomes one or more of the problems or shortcomings set forth above. Specifically the control system can deliver fast response and high control accuracy in the presence of system nonlinearities and uncertainties of a steering mechanism during automated vehicle guidance operations for straight and curved paths.

According to a preferred aspect of the invention, a work vehicle having an automated vehicle guidance operation as controlled by a digital control system is controlled by a nonlinear control system. The control system includes compensation for nonlinearities inherent in a steering mechanism used in controlling a steering angle of at least one wheel of the work vehicle. The control system includes control laws selected based on a steering angle error. The steering angle error is defined as a function of a commanded steering angle from the guidance operation and an actual steering angle of the wheel. A tolerance control law is defined to zero a steering mechanism command for use when the steering angle error is within a predetermined range around zero. A saturation control law is defined to maximize the steering mechanism command for use when the steering angle error is outside a predetermined range. A dynamic control law is defined including deadband compensation, proportional, integral and derivative control portions, and control signal limiting to produce the steering mechanism command when the steering angle error is within predetermined ranges. In addition, the control system reduces the influence of the integral control portion of the dynamic control law as a function of the steering angle error. Once the steering mechanism command is determined, it is output to the steering mechanism to effect a steering movement to the vehicle.

In another aspect of the invention the actual steering angle, as determined, is within a range of error as compared to the steering angle of the at least one wheel under certain circumstances, and the predetermined range for the tolerance control law is defined as a function of the range of error.

As a further aspect of the invention, the saturation control law is defined as a function of estimated deadband, deadband uncertainty and dynamic range characteristics of the steering mechanism, and the predetermined range for the saturation control law is defined as a function of the estimated dynamic range characteristic of the steering mechanism.

According to yet another aspect of the invention, the dynamic control law includes a compensation gain defined as a function of estimates of a steering mechanism gain and a time constant of the steering mechanism, a compensation pole at zero, and a double compensation zero defined as a function of the estimate of the time constant of the steering mechanism. The estimate of the steering mechanism gain is based on a linearized characterization of an estimated dynamic range of the steering mechanism.

Additionally, according to the invention, the tolerance control law steering mechanism command is selected when the work vehicle is removed from the automatic vehicle guidance operation.

Preferred apparatus of the system include, but are not limited to, a central processing unit for control system execution, analog to digital converters for conversion of the actual steering angle and a manual override signal input, an interface between the vehicle guidance system and the control laws, a nonvolatile memory for storing control system parameters, and a program memory for storing the control system's software program.

DETAILED DESCRIPTION OF THE INVENTION

Figure 1:
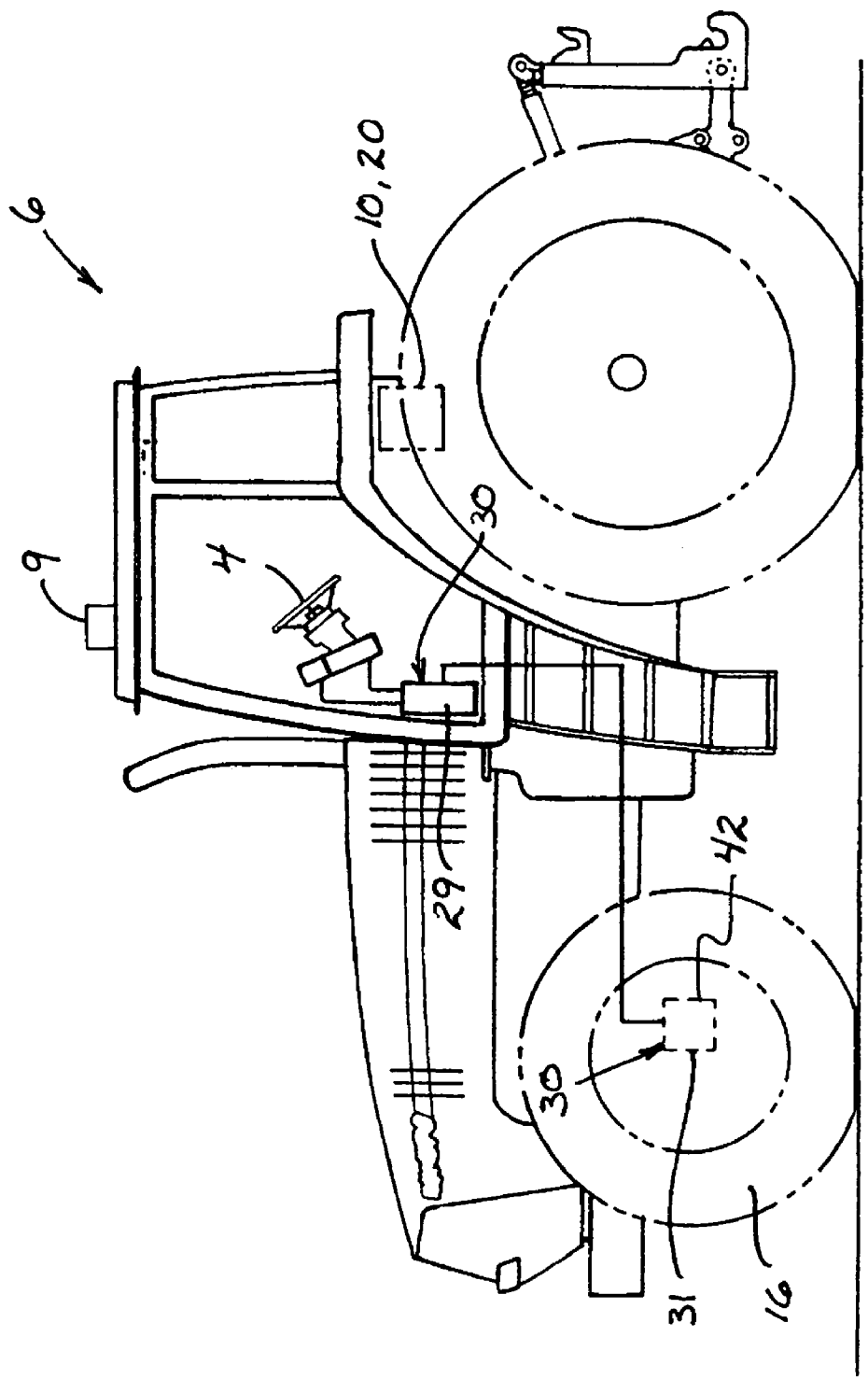
FIG. 1 depicts a representative work vehicle having an automated vehicle guidance system and a steering mechanism including nonlinearities for use with the present invention.

The invention will be described with reference to FIGS. 1 through 6 wherein like numbers refer to like parts. FIG. 1 depicts a representative tractor 6 equipped with an automated vehicle guidance system 10 and a global positioning system, as represented by antenna 9, as part of an overall control scheme. Real time steering control of tractor 6 uses information from automated guidance system 10 such as a steering mode command (AUTO or MANUAL) and a commanded steering angle, and actual steering angle position as determined by a steering angle sensor 42 to produce a steering mechanism command. This steering mechanism command effects steering of at least one wheel 16 actuated by a representative electro-hydraulic steering mechanism 30, depicted by a steering control valve 29 and a steering cylinder 31, in a well known manner. Tractor 6 and electro-hydraulic steering mechanism 30 are representative of the type of work vehicle and steering mechanism for which the present invention is contemplated, but it should be understood that it is contemplated that the invention can likewise be used with other types of work vehicles and steering mechanisms.

Figure 2:
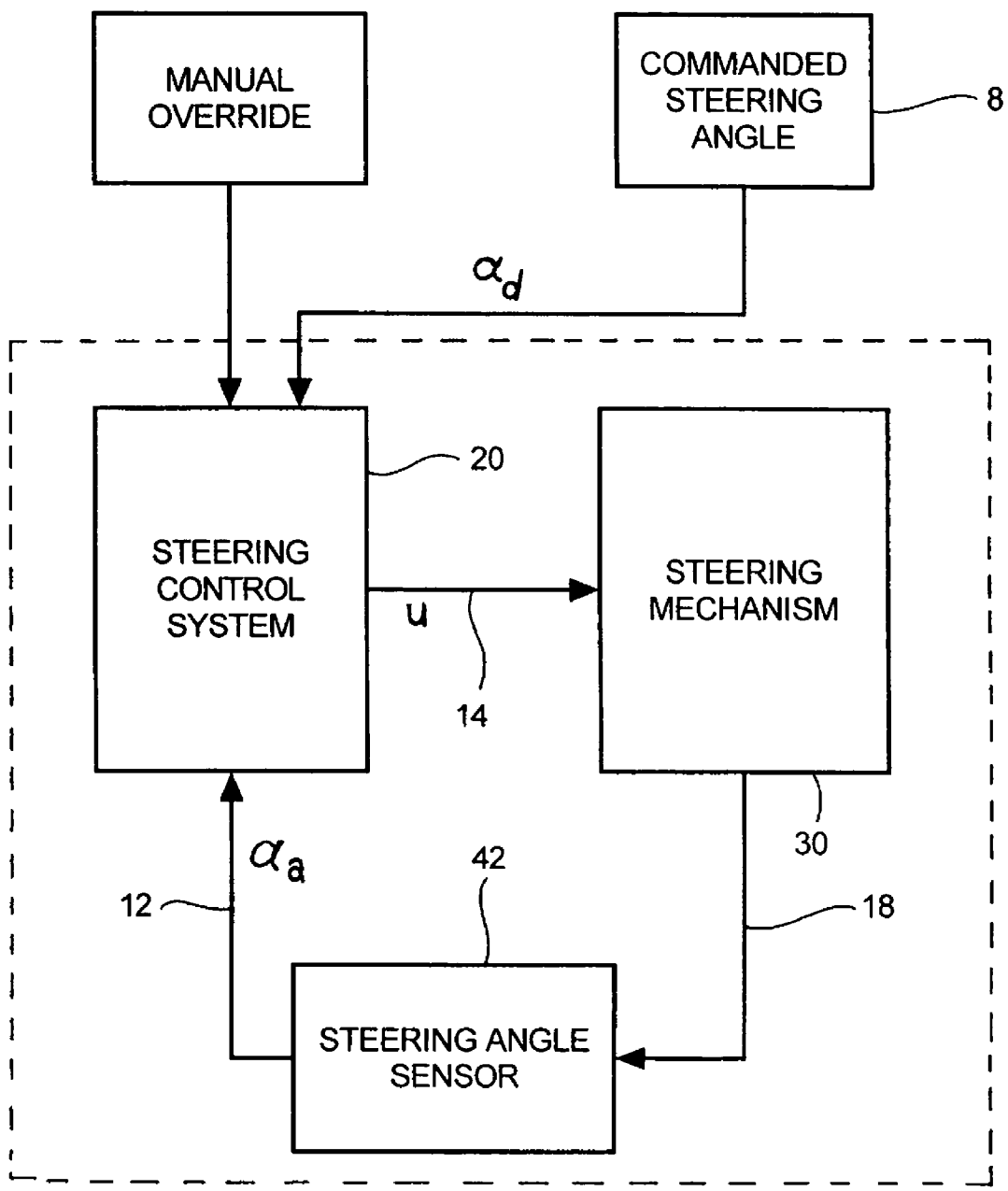
FIG. 2 is a top level block diagram illustrating interconnections between control system components.

According to the present invention, a robust, nonlinear steering control system and method 20 having control laws that adapt in real time to include compensation for nonlinearities and uncertainties of steering mechanism 30 is provided. FIG. 2 is a top level block diagram illustrating interconnections between system components. Steering control system 20 receives a commanded steering angle 8 from automated vehicle guidance system 10 and an actual steering angle 12 from steering angle sensor 42 to produce a steering mechanism command 14. Steering mechanism command 14 effects movement of steering mechanism 30 producing movement of wheel 16 to a steering angle 18.

Figure 3:
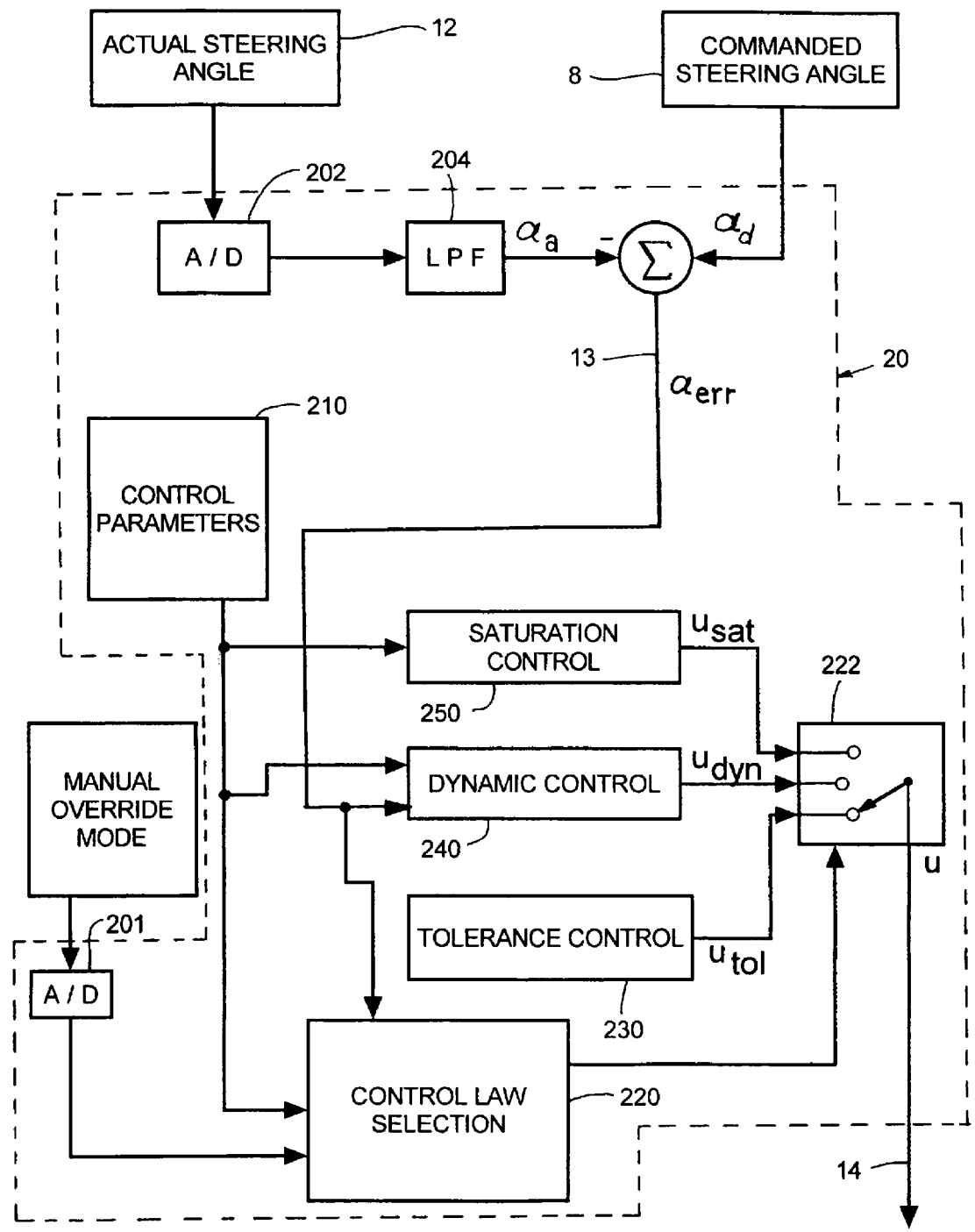
FIG. 3 is a block diagram illustrating a preferred embodiment of a steering control system of the present invention.

FIG. 3 is a block diagram illustration of a preferred embodiment of steering control system 20 which is realized in a microcontroller based embedded electronic steering control unit. Analog to digital converters 201, 202 are used to digitize a manual override signal and actual steering angle 12 provided by steering angle sensor 42. A low pass filter 204 reduces actual steering angle measurement noise and analog to digital converter quantization noise improving the quality of the digital signal. Commanded steering angle 8 is provided by automated vehicle guidance system 10 as previously noted. A group of control parameters is stored in a nonvolatile memory 210 in the electronic steering control unit for implementation of steering control system 20 which includes a tolerance control law 230, a dynamic control law 240, a saturation control law 250, and control law selection logic 220. Control law selection logic 220 determines which control law to implement in real time, adapting to the nonlinearities of the operation range of steering mechanism 30. The adaptivity of steering control system 20 to the nonlinearities of steering mechanism 30 improves steering control performance significantly in terms of control accuracy and robustness in comparison to conventional steering control schemes.

Figure 4A:
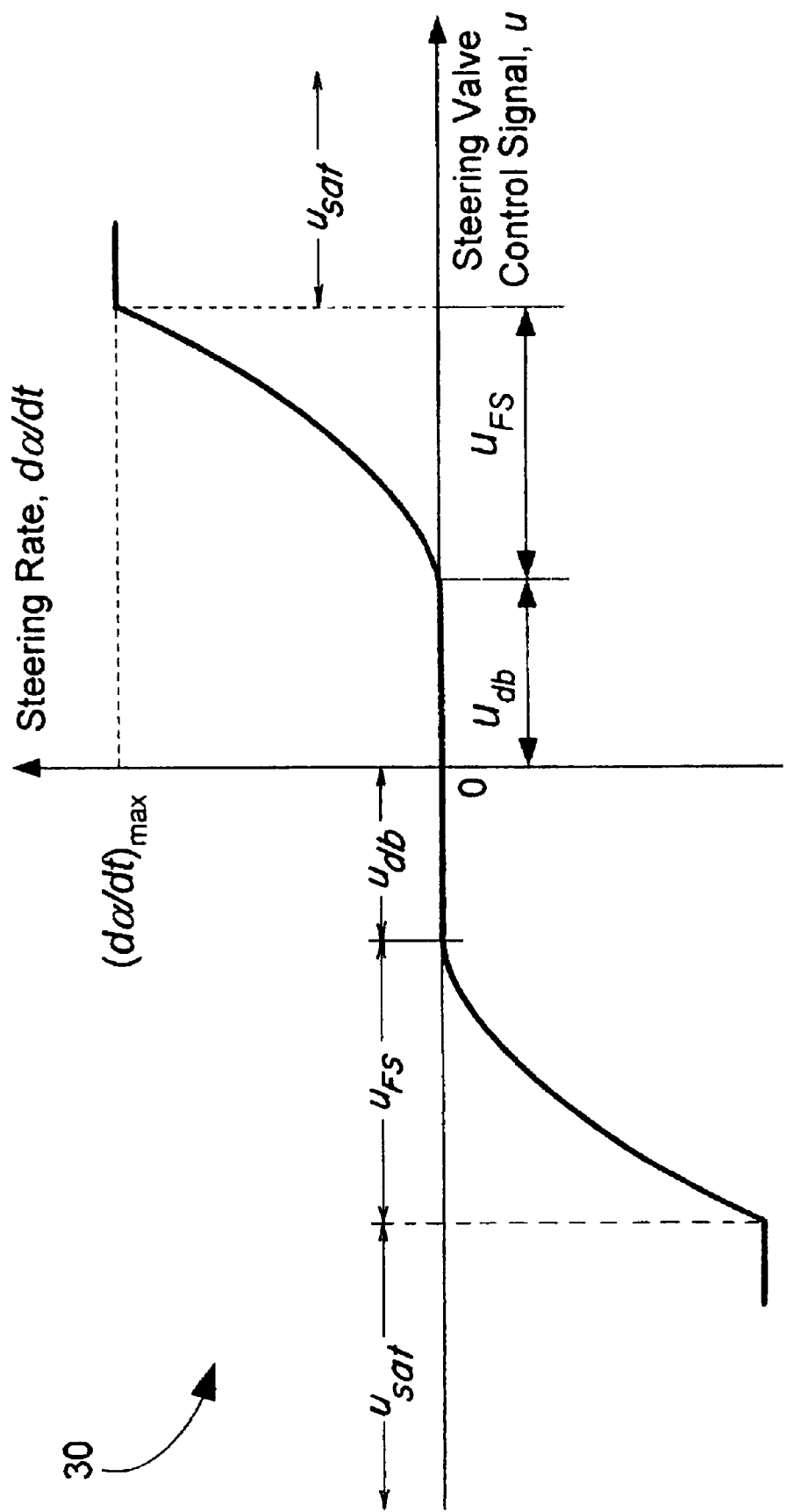
FIG. 4A illustrates a steady-state characterization illustrating nonlinearities of the representative steering mechanism.
Figure 4B:
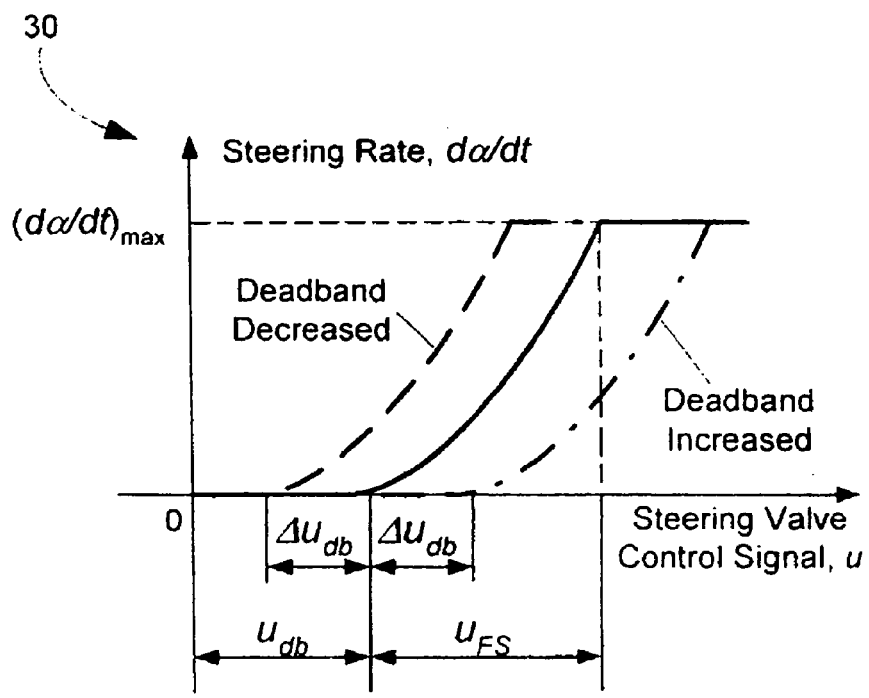
FIG. 4B illustrates the effect of deadband variation on characteristics of the representative steering mechanism.
Figure 4C:
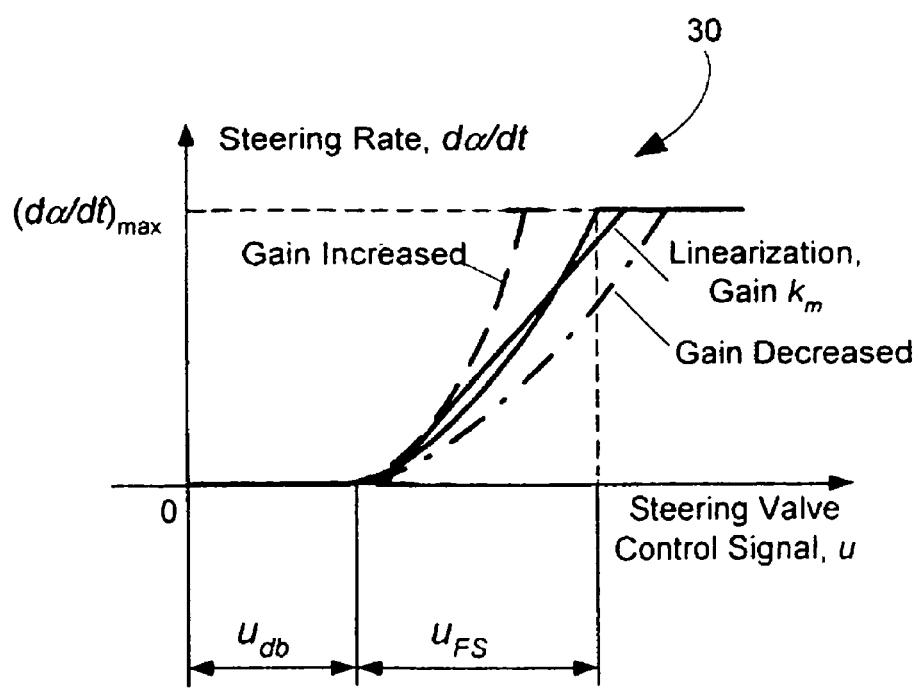
FIG. 4C illustrates the effect of steering mechanism gain variation on characteristics of the representative steering mechanism.
Figure 4D:
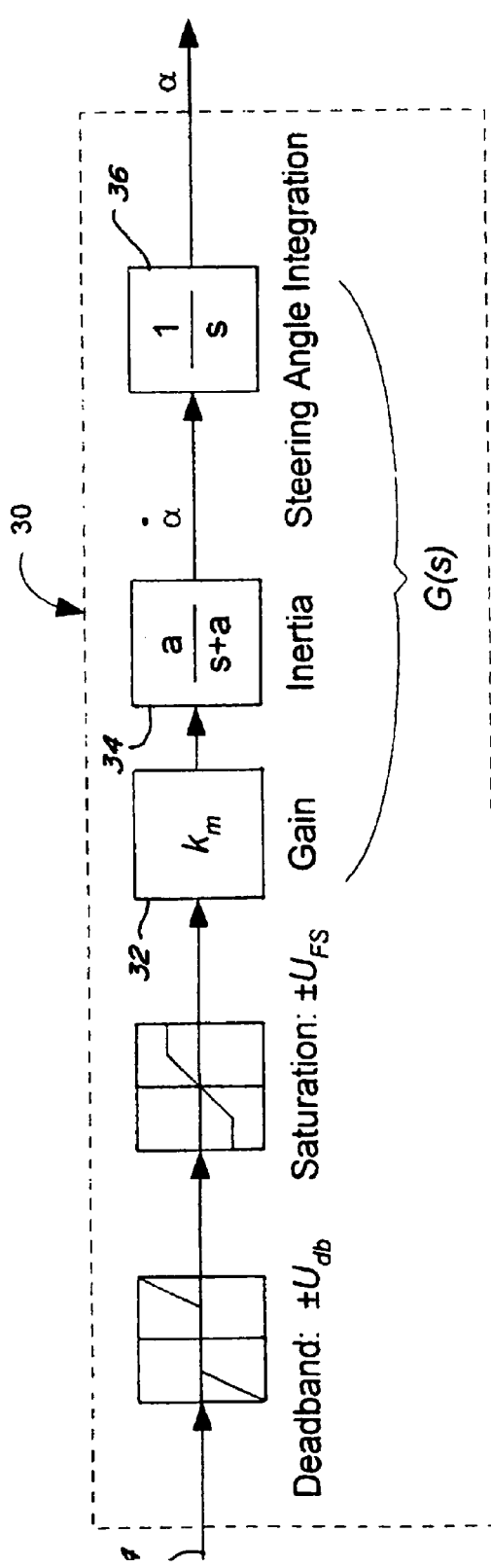
FIG. 4D is a simplified block diagram model of the representative steering mechanism.

FIGS. 4A-4C illustrate typical nonlinearities and uncertainties associated with electro-hydraulic steering mechanism 30. FIG. 4A illustrates a representative steady-state characterization of electro-hydraulic steering mechanism 30 which can be characterized by three ranges: a deadband range $u_{db}$, a dynamic control range $u_{FS}$, and a saturation range $u_{SAT}$. In deadband range $u_{db}$, no steering action occurs in response to steering mechanism commands. In dynamic range $u_{FS}$, steering action occurs in response to steering mechanism commands according to the curve. In saturation range $u_{SAT}$, steering action remains at its maximum value in response to steering mechanism commands. FIG. 4B illustrates the effect of deadband variation on the characteristics of electro-hydraulic steering mechanism 30. $\Delta u_{db}$ denotes the deadband variation that shifts dynamic control range $u_{FS}$ to the left or right. FIG. 4C illustrates the effect of a steering mechanism gain $k_m$ variation on the characteristics of electro-hydraulic steering mechanism 30. Steering mechanism gain $k_m$ is defined as the slope of the straight line as a linearization of dynamic control range $u_{FS}$. The use of previous control systems has required individual calibration to maintain satisfactory steering performance in the presence of deadband and steering mechanism gain $k_m$ variations. FIG. 4D is a block diagram representation of steering mechanism 30 based on the characterization illustrated in FIG. 4A and linearization shown in FIG. 4C. A gain block 32 includes steering mechanism gain $k_m$. An inertia block 34 represents a simplified dynamic characteristic of steering mechanism 30 in response to steering mechanism command 14 where a denotes the reciprocal of the time constant of steering mechanism 30. Integration block 36 performs a time integration of the steering rate dα/dt producing steering angle α. In combination, these blocks define a transfer function G(s) of steering mechanism 30 for dynamic control range $u_{FS}$ with linearization.

Figure 5A:
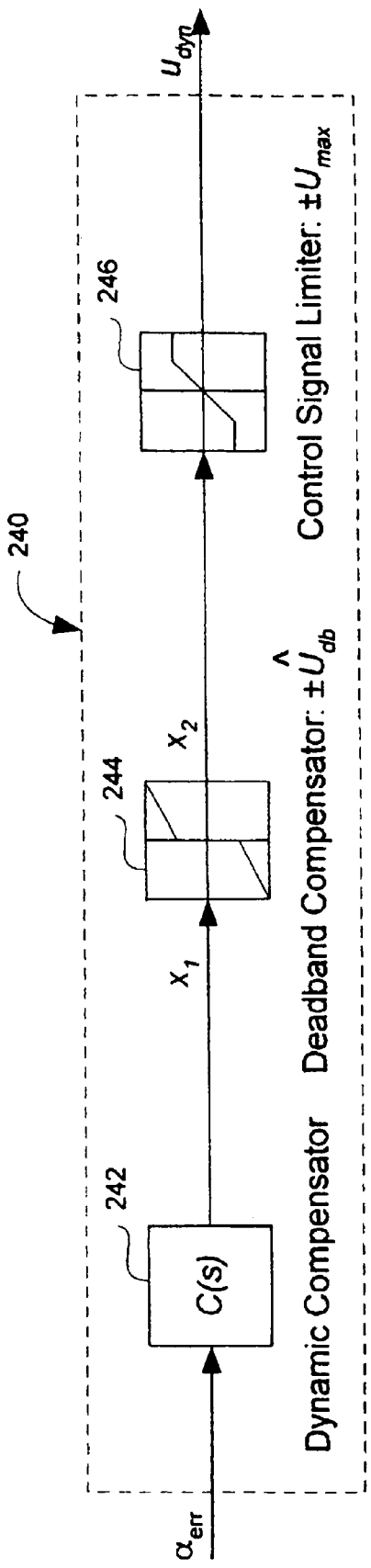
FIG. 5A is a simplified block diagram of a dynamic control law portion according to the present invention.

FIG. 5A is a block diagram representation of dynamic control law 240 including a dynamic compensator 242, a deadband compensator 244, and a control signal limiter 246. Dynamic compensator 242, according to the invention, is defined in transfer function form as:

$$C(s) = k_c \cdot \frac{(s+b)^2}{b^2 s} \quad (1)$$

Dynamic compensator 242 includes a compensation gain $k_c$, a compensation pole at zero, and a double compensation zero at $-b$. Deadband compensator 244 is provided to compensate for the deadband nonlinearity of steering mechanism 30, and is defined as follows:

$$x_2 = \text{sign}(x_1) \cdot (|x_1| + \hat{u}_{db}) \quad (2)$$

where $\hat{u}_{db}$ is an estimate of deadband range $u_{db}$ of steering mechanism 30. Integral compensation associated with the pole at zero of dynamic compensator 242 provides additional deadband compensation when deadband compensator 244 under-compensates for deadband range $u_{db}$, i.e., $\hat{u}_{db}$ is smaller than $u_{db}$, making steering control system 20 less sensitive to deadband uncertainty. Compensation for the deadband nonlinearity is important because otherwise undesirable steering angle errors can sustain at the same time when no steering action occurs. Control signal limiter 246 is provided to prevent steering mechanism 30 from becoming overly energized. It limits steering mechanism command 14 to the range of $\pm U_{max}$, and is represented as follows:

$$u_{dyn} = \begin{cases} x_2, & \text{for } |x_2| \leq U_{max} \\ \text{sign}(x_2) \cdot U_{max}, & \text{for } |x_2| > U_{max} \end{cases} \quad (3)$$

Symbol $u_{dyn}$ represents the output of dynamic control law 240. Symbol $U_{max}$ represents the maximum control signal and is defined as:

$$U_{max} = \hat{u}_{FS} + \hat{u}_{db} + \Delta \hat{u}_{db} \quad (4)$$

where $\hat{u}_{FS}$ and $\Delta \hat{u}_{db}$ are estimates of $u_{FS}$ and $\Delta u_{db}$, respectively, as shown in FIG. 4B.

As an illustration, the preferred embodiment of dynamic control law 240, is applied to representative tractor 6 having the noted estimated parameters that are measured, delineated in the specification, or determined in another suitable manner.

| Parameter | Value |
|---|---|
| $\hat{k}_m$ | 20 deg./sec./Amp |
| $\hat{a}$ | 10 sec$^{-1}$ |
| $\hat{u}_{db}$ | 0.4 Amp |
| $\Delta \hat{u}_{db}$ | 0.16 Amp |
| $\hat{u}_{FS}$ | 1.2 Amp |

Symbols $\hat{k}_m$ and $\hat{a}$ ware estimates of values of $k_m$ (see FIG. 4C) and a, respectively. The value of $\hat{a}$ represents a steering mechanism time constant estimate of 0.1 second. Dynamic compensator 242 having transfer function C(s) defined in Equation 1 has a double-zero at $-b$ set to $-5$. This leads to an open-loop transfer function H(s) including dynamic compensator 242 C(s) and steering mechanism 30 model G(s) as follows:

$$H(s) = C(s) \cdot G(s) = k_c k_m \cdot \frac{(1+0.2s)^2}{s} \cdot \frac{1}{s(1+0.1s)}, \quad (5)$$

for $a = 10, b = 5$

It is important to note that Equation 5 applies to system operation in dynamic control range $u_{FS}$ with linearization, as seen in FIG. 4C, and does not apply to operation in deadband $u_{db}$ or saturation range $u_{SAT}$. Deadband and saturation compensation is achieved by deadband compensator 244 and control signal limiter 246, respectively.

Figure 5B:
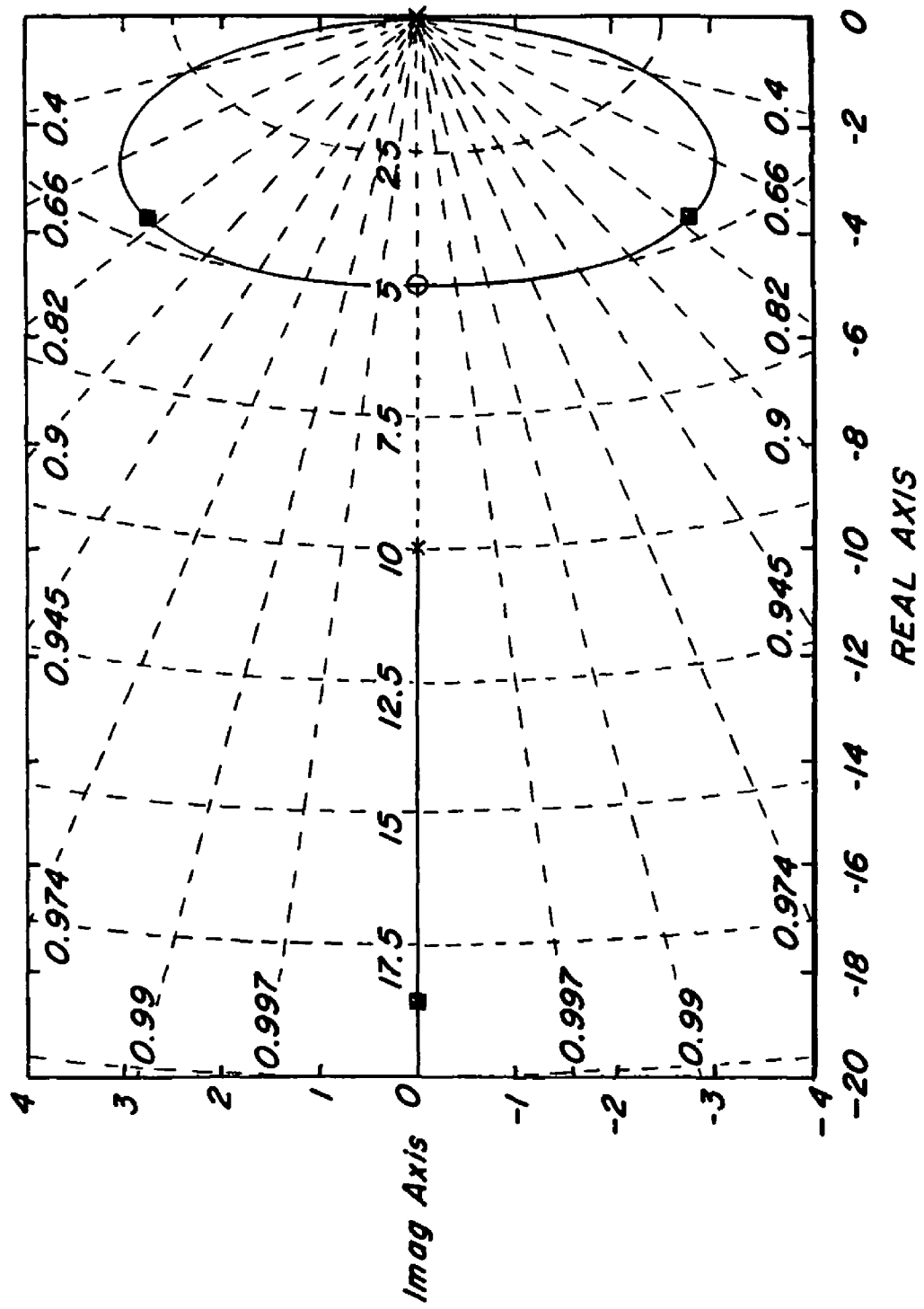
FIG. 5B is an example control system design loot locus plot of a preferred embodiment of the dynamic control law portion of the present invention.

FIG. 5B is a root locus plot of the above open-loop transfer function H(s) with loop gain value $k_c k_m$ set to 40. Closed-loop poles of the system are shown in square marks, and the closed-loop poles that dominate system performance are the pair of complex poles at $-3.73 \pm 2.76i$ which give a damping ratio of 0.804 and bandwidth of 4.65 rad/sec, or system frequency $f_c=0.74$ Hz. Importantly, FIG. 5B illustrates a major advantage of dynamic compensator 242. It is apparent from the root locus that as loop gain $k_c k_m$ increases from 40 toward ∞, the dominant poles move along the plot towards $-5$ on the real axis. Accordingly, a large variation in steering mechanism gain $k_m$ only results in changes of the damping ratio from 0.804 towards 1.0 and the bandwidth from 4.65 towards 5.0 rad/sec. As compensated, the response remains stable and well damped even in the presence of significant loop gain changes. As a result, dynamic compensator 242 exhibits robust performance in the presence of large variations of gain $k_m$, with the corresponding advantage that it requires neither calibration of controller gain $k_c$ for each steering control valve 29 of steering mechanism 30 and varying farming field condition, nor recalibration of controller gain $k_c$ after service or replacement of steering control valve 29 of steering mechanism 30.

Steering control system 20 is implemented on a digital controller running at a sampling rate of $f_s=100$ Hz. Dynamic compensator 242, with transfer function C(s), is implemented digitally with the backward rectangular rule of numerical integration. Since $f_s > 50 f_c$, the difference in system response between continuous domain dynamic compensator 242, with transfer function C(s), and its discrete equivalent is negligible. Replacing s with $(z-1)/Tz$ in accordance with the backward rectangular rule of numerical integration, the discrete equivalent transfer function C(z) for dynamic compensator 242 is obtained as follows:

$$C(z) = \frac{2k_c}{b} + k_c \cdot \frac{T}{1-z^{-1}} + \frac{k_c}{b^2} \cdot \frac{1-z^{-1}}{T} \qquad (6)$$

Discrete transfer function C(z) leads to the following discrete time response equation:

$$x_1(kT) = \frac{2k_c}{b} \cdot \alpha_{err}(kT) + k_c T \cdot \sum_{j=0}^{k} \alpha_{err}(jT) + \frac{k_c}{b^2 T} \cdot \begin{bmatrix} \alpha_{err}(kT) - \\ \alpha_{err}((k-1)T) \end{bmatrix}, \qquad (7)$$

$k = 0, 1, 2, \ldots$ for $\alpha_{tol} < |\alpha_{err}| \le \alpha_{dyn}$

Symbol T denotes a sampling period of the controller, $T=1/f_s$. Symbols $\alpha_{err}$, $\alpha_{tol}$ and $\alpha_{dyn}$ denote a steering angle error, steering angle error tolerance and steering angle error upper-limit of dynamic control range, respectively. The overall discrete time response for dynamic control law 240 is defined by the time responses for dynamic compensator 242 shown in equation 7, deadband compensator 244 shown in equation 2, and control signal limiter 246 shown in equation 3.

Tolerance control law 230 is provided to minimize wear of steering mechanism 30 during very small corrections of steering angle error $\alpha_{err}$ which is defined as function of commanded steering angle 8 and actual steering angle 12. A conventional closed-loop controller drives a plant towards the commanded input with a zero error. In the presence of non-linearities such as those described hereinabove for steering mechanism 30, a conventional controller persistently makes steering angle corrections back and forth in opposite directions around zero error when steering angle error $\alpha_{err}$ is very small. When operating in deadband range $u_{db}$, considerable back and forth movement within steering mechanism 30 may occur even for very small steering corrections. This zero-error control effort can result in accelerated wear of steering mechanism 30. To resolve this problem, tolerance control law 230 pauses actuation of steering mechanism 30 when steering angle error $\alpha_{err}$ is within a steering error tolerance range $\alpha_{tol}$, $|\alpha_{err}| \le \alpha_{tol}$, to eliminate unnecessary accelerated wear of steering mechanism 30. Steering angle error tolerance $\alpha_{tol}$ should be larger than the resolution of steering angle sensor 42 in order to be executable, but small enough not to affect steering control accuracy by an uncorrected steering angle error within tolerance range $\alpha_{tol}$. In the illustrated example, analog to digital converter 202 is a 12-bit analog to digital converter with a 5V reference voltage, and steering angle sensor 42 has a measurement sensitivity of 44.44 mV per degree, leading to a steering angle measurement resolution $\alpha_{res}$ of 0.0275 degree. Steering angle error tolerance $\alpha_{tol}$ is defined as follows:

$$\alpha_{tol} = \begin{cases} 4\alpha_{res} & \text{for 12-bit A/D converter} \\ 2\alpha_{res} & \text{for 10-bit A/D converter} \end{cases} \qquad (8)$$

Tolerance control law 230 is also implemented for manual mode steering and is defined as follows:

$$u_{tol}(kT) = 0 \qquad (9)$$

for $|\alpha_{err}| \le \alpha_{tol}$ $$\sum_{j=0}^{k} \alpha_{err}(jT) = 0$$

or manual mode steering

Symbol $u_{tol}$ represents the output of the tolerance control law. The steering angle error discrete integration term from equation 7 is set to zero to eliminate the uncontrolled effect of time accumulation of steering angle error $\alpha_{err}$ to smooth transition of steering control system 20 from tolerance control law 230 to dynamic control law 240. It is contemplated that this discrete integration term could be set to a small, but non-zero value as well.

Saturation control law 250 sustains the maximum steering rate of steering mechanism 30, stops discrete integration of steering angle error $\alpha_{err}$ to reduce the depth of saturation, and, in the same manner as tolerance control law 230, eliminates the uncontrolled effect of discrete integration of steering angle error $\alpha_{err}$ to smooth transition of steering control system 20 from saturation control law 250 to dynamic control law 240. Again, it is contemplated that this discrete integration term could be set to a small, but non-zero value as well. Saturation control law 250 is defined as follows:

$$u_{sat}(kT) = u_{max} \qquad (10)$$

for $|\alpha_{err}| > \alpha_{dyn}$ $$\sum_{j=0}^{k} \alpha_{err}(jT) = 0$$

Symbol $u_{sat}$ represents the output of the saturation control law, and a steering angle error upper-limit of dynamic control range $u_{dyn}$ is defined as:

$$\alpha_{dyn} = \frac{\hat{u}_{FS}}{2k_c/b} \qquad (11)$$

Figure 6A:
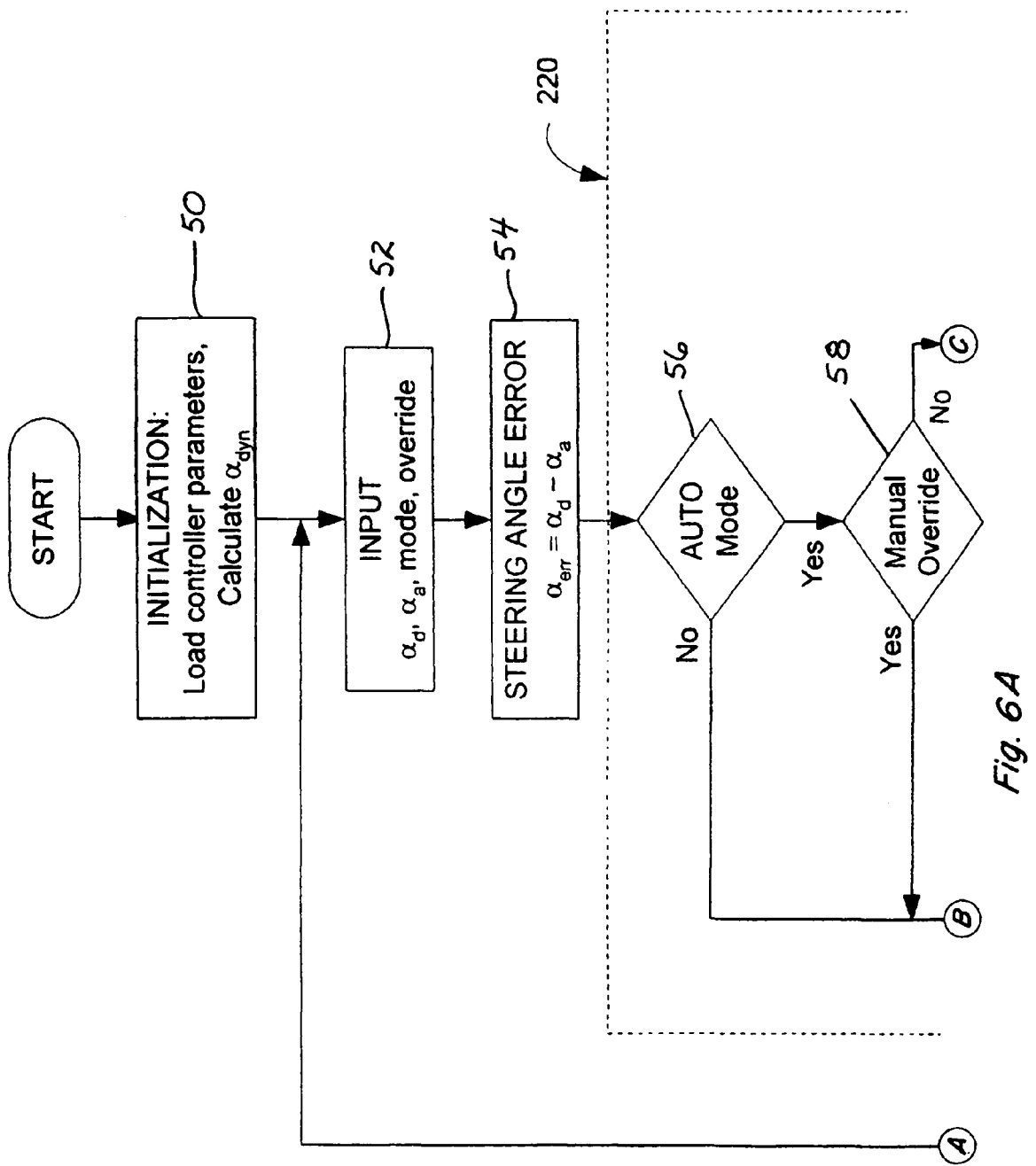
FIGS. 6A-6B depict a top level flow diagram of the steering control system including control law selection logic.
Figure 6B:
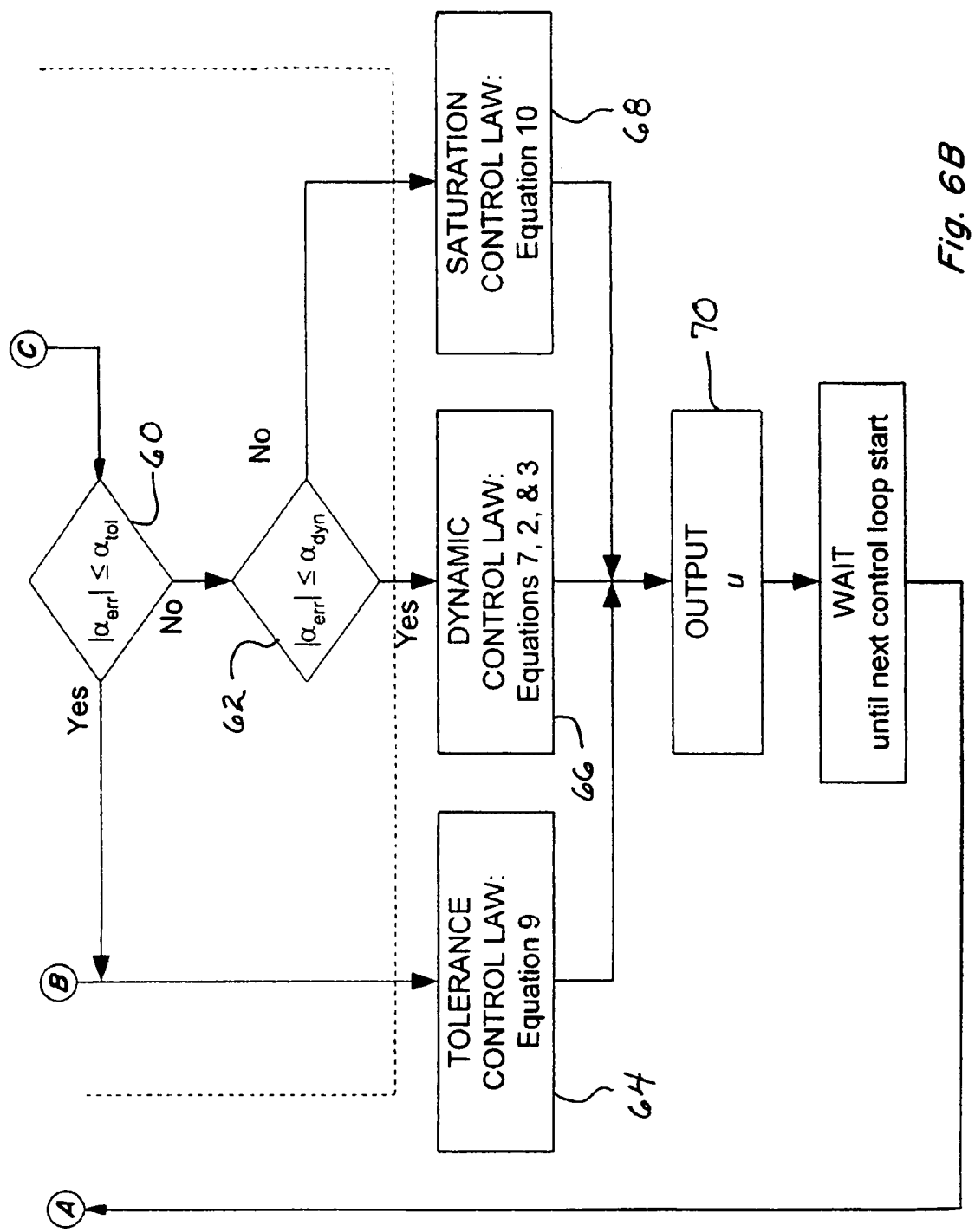

FIGS. 6A and 6B depict a top level flowchart including control law selection logic 220 for steering control system 20. Control law parameters, which include, but are not limited to $\hat{k}_m$, $\hat{a}$, $\hat{u}_{FS}$, $\hat{u}_{db}$, $\Delta \hat{u}_{db}$, $k_c$, b, and $\alpha_{tol}$, are loaded from nonvolatile memory 210 during initialization of the system and used to compute $\alpha_{dyn}$ as shown at block 50. Commanded steering angle 8, actual steering angle 12, and steering mode are input to steering control system 20 at block 52. Steering angle error $\alpha_{err}$ is computed as shown at block 54 based on commanded steering angle 8 and actual steering angle 12. Control law selection logic 220 determines if tractor 6 is being operated in the manual mode at decision blocks 56 and 58. During manual mode operation, tolerance control law 230 output is selected at block 64. During automated vehicle guidance operations, the magnitude of steering angle error $\alpha_{err}$ is compared to steering angle error tolerance $\alpha_{tol}$ at decision block 60. If the magnitude of steering angle error $\alpha_{err}$ is within steering angle error tolerance $\alpha_{tol}$, then tolerance control law 230 output is selected at block 64. If the magnitude of steering angle error $\alpha_{err}$ is outside steering angle error tolerance $\alpha_{tol}$, then the magnitude of steering angle error $\alpha_{err}$ is compared to steering angle error upper-limit $\alpha_{dyn}$ at decision block 62. If the magnitude of steering angle error $\alpha_{err}$ is within steering angle error upper-limit $\alpha_{dyn}$, then dynamic control law 240 outputs are selected at block 66. If the magnitude of steering angle error $\alpha_{err}$ is outside steering angle error upper-limit $\alpha_{dyn}$, then saturation control law 250 output is selected at block 68. At block 70 the selected control law command is output to steering mechanism 30 to effect movement of wheel 16.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method of nonlinear steering control of a work vehicle during an automated vehicle guidance operation as controlled by a digital control system, the work vehicle having a steering mechanism for control of a steering angle of at least one wheel comprising the steps of:
   determining an actual steering angle of the at least one wheel;
   defining a steering angle error as a function of a commanded steering angle and the actual steering angle;
   defining a tolerance control law to zero a steering mechanism command for use when the steering angle error is within a predetermined range around zero;
   defining a saturation control law to maximize the steering mechanism command for use when the steering angle error is outside a predetermined range;
   defining a dynamic control law including deadband compensation, proportional, integral and derivative control portions, and control signal limiting to produce the steering mechanism command when the steering angle error is within predetermined ranges;
   reducing influence of the integral control portion of the dynamic control law as a function of the steering angle error; and
   outputting the steering mechanism command to the steering mechanism to effect a steering movement to the vehicle.

2. The method of claim 1, wherein the actual steering angle is within a range of error as compared to the steering angle of the at least one wheel under certain circumstances, and the predetermined range for the tolerance control law is defined as a function of the range of error.

3. The method of claim 1, wherein the saturation control law is defined as a function of estimated deadband, deadband uncertainty and dynamic range characteristics of the steering mechanism, and the predetermined range for the saturation control law is defined as a function of the estimated dynamic range characteristic of the steering mechanism.

4. The method of claim 1, wherein the dynamic control law includes a compensation gain defined as a function of estimates of a steering mechanism gain and a time constant of the steering mechanism, a compensation pole at zero, and a double compensation zero defined as a function of the estimate of the time constant of the steering mechanism.

5. The method of claim 4, wherein the estimate of the steering mechanism gain is based on a linearized characterization of an estimated dynamic range of the steering mechanism.

6. The method of claim 1, wherein the tolerance control law steering mechanism command is selected when the work vehicle is removed from the automatic vehicle guidance operation.

7. A nonlinear steering control system for a work vehicle for use during an automated vehicle guidance operation, the work vehicle having a steering mechanism for control of a steering angle of at least one wheel comprising:
   a sensing system operable to determine an actual steering angle of the at least one wheel, and output information representative of the actual steering angle, the actual steering angle including a range of error as compared to the steering angle of the at least one wheel under certain circumstances;
   a vehicle guidance system operable to determine a vehicle guidance mode and a steering angle command and output information representative of the vehicle guidance mode and the steering angle command for control of the at least one wheel;
   a control system defining more than one control law and operable to receive information representative of the steering angle command and the actual steering angle, and to compute a steering angle error as a function thereof, the control system further operable to select a steering mechanism command from the more than one control law as a function of the steering angle error and output information representative of the steering mechanism command to the steering mechanism;
   the control system defining a tolerance control law to zero a steering mechanism command for use when the steering angle error is within a predetermined range around zero;
   the control system further defining a saturation control law to maximize the steering mechanism command for use when the steering angle error is outside a predetermined range;
   the control system further defining a dynamic control law including deadband compensation, proportional, integral and derivative control portions, and control signal limiting to produce the steering mechanism command when the steering angle error is within predetermined ranges; and
   the control system further operable to reduce influence of the integral control portion of the dynamic control law as a function of the steering angle error.

8. The control system of claim 7, wherein the saturation control law is defined as a function of estimated deadband, deadband uncertainty and dynamic range characteristics of the steering mechanism, and the predetermined range for the saturation control law is defined as a function of the estimated dynamic range characteristic of the steering mechanism.

9. The control system of claim 7, wherein the dynamic control law includes a compensation gain defined as a function of estimates of a steering mechanism gain and a time constant of the steering mechanism, a compensation pole at zero, and a double compensation zero defined as a function of the estimate of the time constant of the steering mechanism.

10. The control system of claim 7, wherein the estimate of the steering mechanism gain is based on a linearized characterization of an estimated dynamic range of the steering mechanism.

11. The control system of claim 7, wherein the tolerance control law steering mechanism command is selected when the work vehicle is removed from the automatic vehicle guidance operation.

12. A method of nonlinear steering control of a work vehicle during an automated vehicle guidance operation as controlled by a digital control system with an associated sampling frequency, the work vehicle having a steering mechanism for control of a steering angle of at least one wheel comprising the steps of:
   determining an actual steering angle of the at least one wheel, the actual steering angle within a range of error under certain circumstances as compared to the steering angle of the at least one wheel;
   defining a steering angle error as a function of a commanded steering angle and the actual steering angle;
   determining estimates of nonlinearities of the steering mechanism including an estimated deadband, an estimated deadband uncertainty, an estimated dynamic range, an estimated time constant over the estimated dynamic range, and an estimated gain based on a linearized characterization of the estimated dynamic range of the steering mechanism;

defining a dynamic control law including a deadband compensator defined as a function of the estimated deadband; a proportional control portion, an integral control portion, and a derivative control portion, each defined as a function of the steering angle error and the sampling frequency associated with the control system; and a control signal limiter defined as a function of the estimated deadband, the estimated deadband uncertainty, and the estimated dynamic range of the steering mechanism;

defining a tolerance control law as a function of the range of error of the actual steering angle, the tolerance control law further defining the integral control portion of the dynamic control law to a known value;

defining a saturation control law as a function of the estimated deadband, the estimated deadband uncertainty and the estimated dynamic range characteristics of the steering mechanism, the saturation control law further defining the integral control portion of the dynamic control law to a known value;

selecting a steering mechanism command from the dynamic control law, the tolerance control law, or the saturation control law as a function of the steering angle error; and outputting the steering mechanism command to the steering mechanism to effect a steering movement to the vehicle.

13. The method of claim 12, wherein the saturation control law maximizes the steering mechanism command when the magnitude of the steering angle error exceeds a defined maximum dynamic error defined as a function of the estimated dynamic range of the steering mechanism.

14. The method of claim 12, wherein the tolerance control law zeros the steering mechanism command when the steering angle error is within a defined tolerance around zero, the tolerance defined as a function of the range of error.

15. The method of claim 12, wherein the proportional gain, the integral gain, and the derivative gain have predefined values based on estimates of a steering mechanism gain and a time constant of the steering mechanism.

16. The method of claim 12, wherein the tolerance control law steering mechanism command is selected when the work vehicle is removed from the automatic vehicle guidance operation.

* * * * *